J. J. CORCORAN.
FARM GATE.
APPLICATION FILED JUNE 6, 1911.
1,038,854.
Patented Sept. 17, 1912.
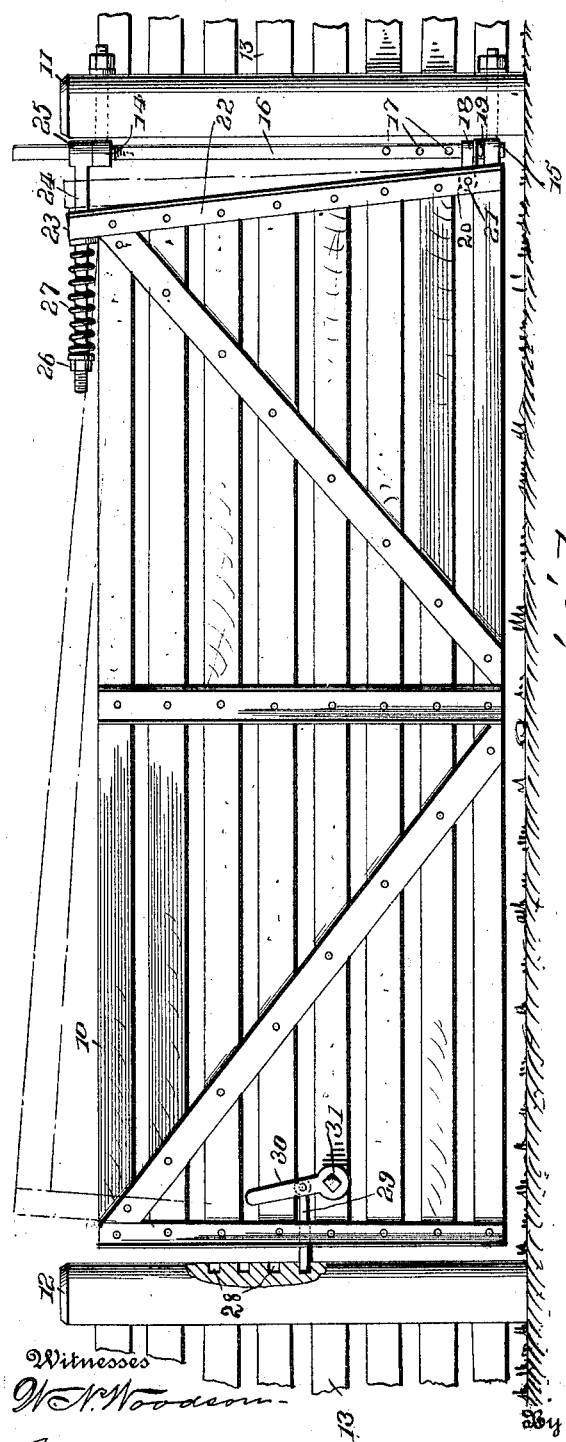
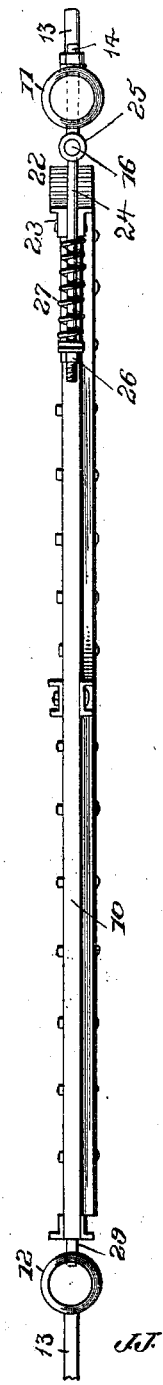

UNITED STATES PATENT OFFICE.

JAMES J. CORCORAN, OF ADRIAN, MICHIGAN.

FARM-GATE.

1,038,854.  Specification of Letters Patent.  Patented Sept. 17, 1912.

Application filed June 6, 1911.  Serial No. 631,541.

*To all whom it may concern:*

Be it known that I, JAMES J. CORCORAN, citizen of the United States, residing at Adrian, in the county of Lenawee and State of Michigan, have invented certain new and useful Improvements in Farm-Gates, of which the following is a specification.

This invention relates to improvements in gates, and more particularly to the larger class of farm gates and similar structures, and has for one of its objects to improve the construction and increase the efficiency and utility of devices of this character.

Another object of the invention is to provide a device which will be substantially automatic when being opened.

Another object of the invention is to provide a device which may be adjusted vertically to permit smaller animals to pass beneath it while excluding the larger animals, and also to adjust the gate to enable it to swing over accumulations of snow ice, and other obstructions.

With these and other objects in view, the invention consists of certain novel features of construction as hereafter shown and described and then specifically pointed out in the claim, and in the drawings illustrative of the preferred embodiment of the invention: Figure 1 is a side elevation of the improved gate in closed position; Fig. 2 is a plan view of the same.

The improved gate may be constructed of any suitable material and of any required size, and it is not desired therefore to limit the invention in these particulars.

For the purpose of illustration a conventional gate is represented at 10 and located between two posts, a hinge post 11 and a latch post 12 with the fence structure represented conventionally at 13 and terminating at the posts 11—12. Connected to the post 11 are two eye bolts 14—15, and extending through these eye bolts is a vertical member 16, preferably formed of a section of gas piping to combine strength with lightness. The vertical member 16 is provided with a plurality of apertures 17 spaced apart, and adjustably disposed upon the member 16 is a collar 18, the collar designed for vertical adjustment by means of a pin 19 inserted into one of the apertures 17. By this means the collar is adjustable to any required extent within the range of the apertures 17. Extending from one side of the collar 18 is a web or arm 20 to which the gate 10 is pivotally united at 21.

The terminal member of the gate next to the hinge post is inclined at its upper end toward the latch post 12 as shown, this inclined member being denoted by the character 22. The member 22 extends above the upper member of the gate as shown at 23, and extending through this extended portion is a horizontal rod 24, the rod having an eye 25 at one end swingingly engaging over the upper end of the member 16 and supported by the upper eye-bolt 14, and with an adjusting nut 26 at the other end. A spring 27 surrounds the rod 24 between the nut 26 and the upwardly extending terminal 23 of the member 22 and exerts its force to move the gate toward the vertical member 16 as hereafter explained. The latch post 12 is provided with a plurality of sockets 28 and the gate 10 is provided with a slidable latch bolt 29. The bolt 29 is arranged to be operated by a hand-lever 30 pivoted at 31 to the gate. By this simple arrangement it will be obvious that when the gate is depressed at its latch end and the bolt 29 operated to engage in the lowermost of the sockets 28 the gate will be maintained in its horizontal position with the spring 27 compressed, the gate then being in the position shown in full lines in Fig. 1. When the gate is to be opened the operator simply actuates the lever 30 to withdraw the bolt 29 from its socket when the spring 27 will immediately exert its force to elevate the gate at its free end into the position shown by dotted lines in Fig. 1, the collar 18 it will be understood, being sufficiently loose to permit this movement of the gate. The gate being thrown into the position shown in dotted lines, will automatically swing into open position upon the member 16 as a hinge pintle. When the gate is to be closed the operator swings it into closed position and depresses the free end against the resistance of the spring 27 and again actuates the lever 30 manually to engage the bolt 29 with the socket.

By providing a plurality of the apertures 17 and a plurality of the sockets 28, the gate may be adjusted with its lower member at any required distance from the ground within the range of the apertures and sockets, and thus adapt the gate to the conditions of the ground and to the season of the year. For instance, in the winter time the gate may be elevated to enable it to swing clear of accumulations of ice or snow. This is a great convenience and materially increases the efficiency and utility of the gate. The vertical adjustment also permits the gate to be arranged to allow smaller animals to pass beneath it while excluding the larger animals. This is also an important advantage in connection with gates of this character.

Having thus described the invention, what I claim is:

In a gate, a latch post and a hinge post spaced apart, a gate, a vertical guide member connected to the hinge post, a lower sleeve slidable and rotatable upon said guide member and provided with a projection pivotally connected to the gate whereby the gate will swing vertically and laterally relative to the guide member, an upper sleeve rotatable upon the guide member and having a rod extending therefrom, a spring carried upon said rod and operating to draw the gate toward the guide member, and a latch device operating to detachably connect the gate to the latch post.

In testimony whereof, I affix my signature in presence of two witnesses.

JAMES J. CORCORAN. [L. S.]

Witnesses:
VAL. RIEGEL,
M. J. LILLY.

Copies of this patent may be obtained for five cents each, by addressing the "Commissioner of Patents, Washington, D. C."